United States Patent [19]

Ikeda et al.

[11] Patent Number: 5,418,727
[45] Date of Patent: May 23, 1995

[54] CONTROL APPARATUS FOR ENSURING SAFETY OF A VEHICLE RUN

[75] Inventors: Toshifumi Ikeda; Seiji Matsumoto; Hirofumi Seni, all of Hiroshima, Japan

[73] Assignee: Mazda Motor Corporation, Hiroshima, Japan

[21] Appl. No.: 69,396

[22] Filed: Jun. 1, 1993

[30] Foreign Application Priority Data

Jun. 2, 1992 [JP] Japan ................... 4-141157

[51] Int. Cl.⁶ .................. G08G 1/16; B60T 8/32
[52] U.S. Cl. .................. 364/426.04; 364/424.03; 364/461; 364/561; 340/903; 340/438
[58] Field of Search ............ 364/426.04, 426.05, 364/426.03, 424.03, 424.05, 578, 561, 461; 180/197, 169; 303/92, 93; 340/902, 903, 943, 438, 441

[56] References Cited

U.S. PATENT DOCUMENTS

| | | | |
|---|---|---|---|
| 4,621,705 | 11/1986 | Etoh | 180/169 |
| 4,692,764 | 9/1987 | Bonar | 342/71 |
| 4,817,418 | 4/1989 | Asami et al. | 364/550 |
| 4,934,477 | 6/1990 | Dai | 180/169 |
| 5,032,997 | 7/1991 | Kawagoe | 364/424.05 |
| 5,165,497 | 11/1992 | Chi | 180/169 |
| 5,173,859 | 12/1992 | Deering | 364/426.01 |
| 5,189,619 | 2/1993 | Adachi et al. | 364/426.04 |
| 5,197,562 | 3/1993 | Kakinami et al. | 180/169 |
| 5,278,764 | 1/1994 | Iizuka et al. | 364/461 |
| 5,286,099 | 2/1994 | Fujita et al. | 303/103 |

FOREIGN PATENT DOCUMENTS 54-33444 3/1979 Japan.

*Primary Examiner*—Kevin J. Teska
*Assistant Examiner*—Tan Q. Nguyen
*Attorney, Agent, or Firm*—Sixbey, Friedman, Leedom & Ferguson; Gerald J. Ferguson, Jr.; Donald R. Studebaker

[57] ABSTRACT

A first control device regarding a running stability of a vehicle, such as an anti-skid braking system, a four wheel steering system, a four wheel driving device and a second control device for automatically avoiding the vehicle from being in a dangerous state, such as an automatic braking device, an automatic steering device are provided. Further provided is a fail judging device for judging a fail time when the first control device improperly works. The control for avoiding a danger by the second control device is restricted when the fail judging device judges the fail time of the first control device. Thereby, when the first control device fails, measures to automatically avoid the danger independent of a driver's intention by such as an automatic braking, an automatic steering, is not taken. This previously prevents the vehicle from being unstable.

15 Claims, 7 Drawing Sheets

CONTROL APPARATUS FOR ENSURING SAFETY OF A VEHICLE RUN

BACKGROUND OF THE INVENTION

This invention relates to a control apparatus for ensuring safety of a vehicle run having a first control device regarding a running stability of a vehicle and a second control device for avoiding a vehicle run from being involved in a dangerous state, in particular, relates to measures against a fail of the first control device.

Conventionally, as a device for avoiding a vehicle run from being involved in a dangerous state, there have been known an automatic braking device and an automatic steering device. The automatic braking device is so composed to continuously detect a distance and a relative velocity between a vehicle and a forward vehicle by using an optical method, ultrasonic waves or the like, judge whether there is a possibility of contact between the vehicle and the forward vehicle by the detected distance and relative velocity, and operate an actuator to automatically apply a braking force to each wheel when it is judged that there is the possibility of contact as well as, for example, as disclosed in Japanese Patent Application Open Gazette No. 54-33444. The automatic steering device is so composed that when judged is that there is the possibility of contact in the automatic braking device, a running path for avoiding the contact is expected, and front wheels are automatically steered so that a vehicle can run along the path, for example, as disclosed in Japanese Patent Application Open Gazette No. 64-26913.

As a device regarding a running stability of a vehicle, there have been generally known a four wheel steering system (4WS) for steering rear wheels in a same phase and in a same direction as steering direction of front wheel at steering front wheels, an anti-skid braking system (ABS) for restraining a considerable braking force at braking a vehicle, a four wheel driving device (4WD) and the like. Such kinds of devices are in general so composed that whether each element composing the devices correctly works is detected using a sensor and safety measures to raise an alarm or the like at a fail of the element is provided (see U.S. Pat. Nos. 5,082,080 and 4,840,243).

When the automatic braking device or the automatic steering device works, a vehicle run is easy to fall into an unstable state. Accordingly, such devices are preferably provided on a vehicle together with a device regarding a running stability of a vehicle such as the 4WS, the ABS, the 4WD or the like. However, even though the device for avoiding a vehicle, run from being involved in a dangerous state and the device regarding a running stability of a vehicle are provided together, working of the automatic braking device or the automatic steering device at a fail of the device regarding a running stability makes a vehicle run unstable.

SUMMARY OF THE INVENTION

In view of the foregoing problem, this invention has an object, when a device regarding a running stability of a vehicle is provided on a vehicle together with an automatic braking device or an automatic steering device, of effectively taking safety measures of a vehicle run in such a manner that the working of the automatic braking device or the automatic steering device is appropriately controlled at a fail of the device regarding a running stability.

To attain the foregoing object, a control apparatus for ensuring safety of a vehicle run of this invention comprises a first control device, a second control device, fail judging means and restricting means. The first control device controls a first factor with regard to a running stability of a vehicle. The second control device has a dangerous state judging means for detecting a running state of a vehicle and judging whether the running state is in a dangerous state to output a judgment signal, and a control means for automatically controlling a second factor with regard to a vehicle run so as to avoid the dangerous state when the dangerous state judging means judges the running state is in the dangerous state, so that the vehicle run is automatically prevented from falling into a further dangerous state. The fail judging means judges whether the first control device properly works and detects a time the first control device improperly works (a fail time) to output a signal. The restricting means restricts a control operation by the second control device for avoiding the dangerous state when the fail judging means detects the fail time that the first control device improperly works.

According to the above construction, when the first control device does not properly work, it is detected by the fail judging means. Then, the operation of the second control device is restricted by the restricting means which receives a signal from the fail judging means. Accordingly, measures to avoid the dangerous state by the automatic braking device or the automatic steering device cannot be automatically taken without a driver's intention, so that the vehicle run is previously prevented from falling into an unstable state.

The above and further objects, features and advantages of the invention will more fully appear from the following description of preferred embodiments when the same is read in connection with the accompanying drawings.

BRIEF DESCRIPTION OF THE DRAWINGS

Preferred embodiments of the present invention are illustrated in the drawings, in which.

DESCRIPTION OF THE PREFERRED EMBODIMENTS

Described below are preferred embodiments of the present invention, with reference to the accompanying drawings.

Figure 1:
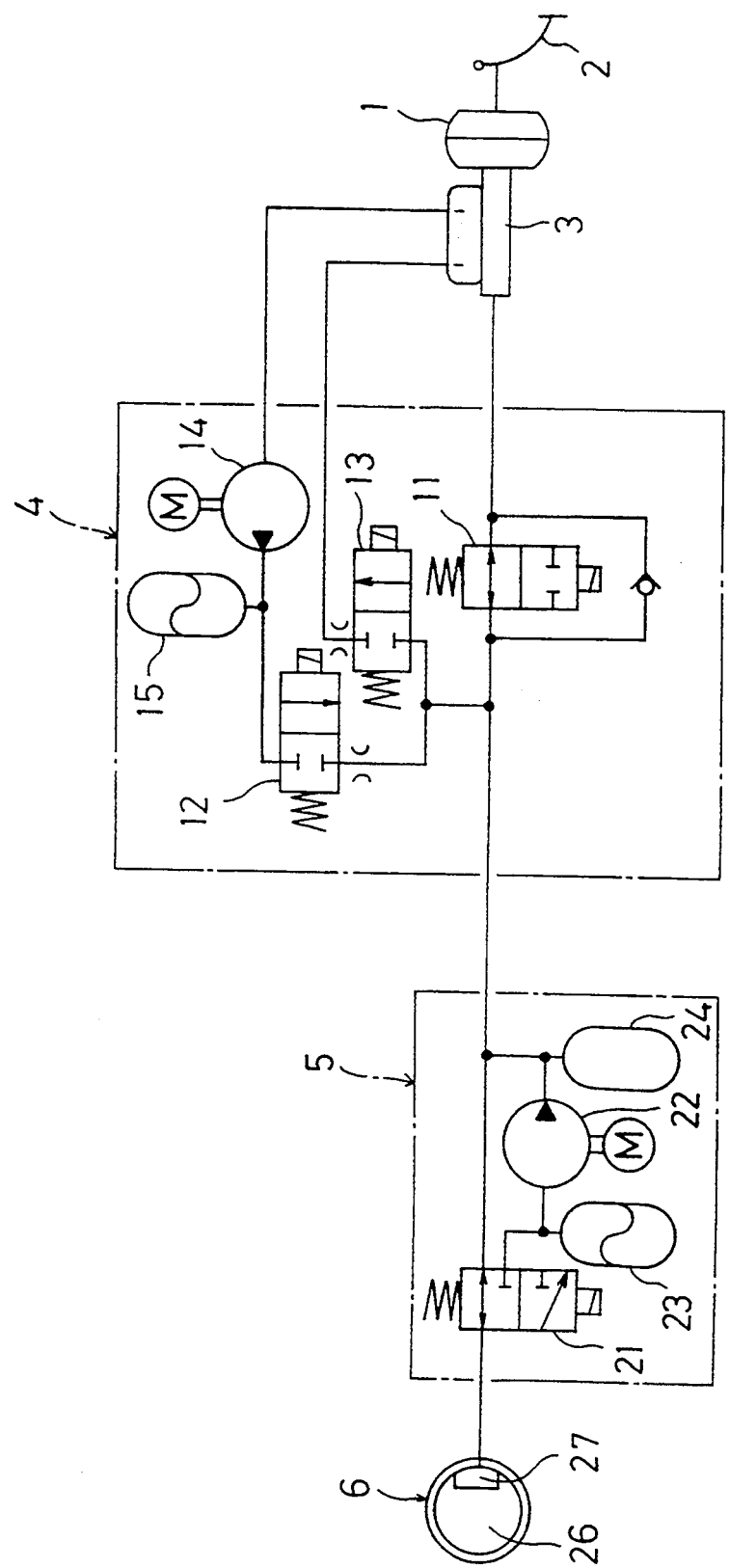
FIG. 1 is a hydraulic circuit diagram of an automatic braking device according to a first embodiment of the present invention.
Figure 2:
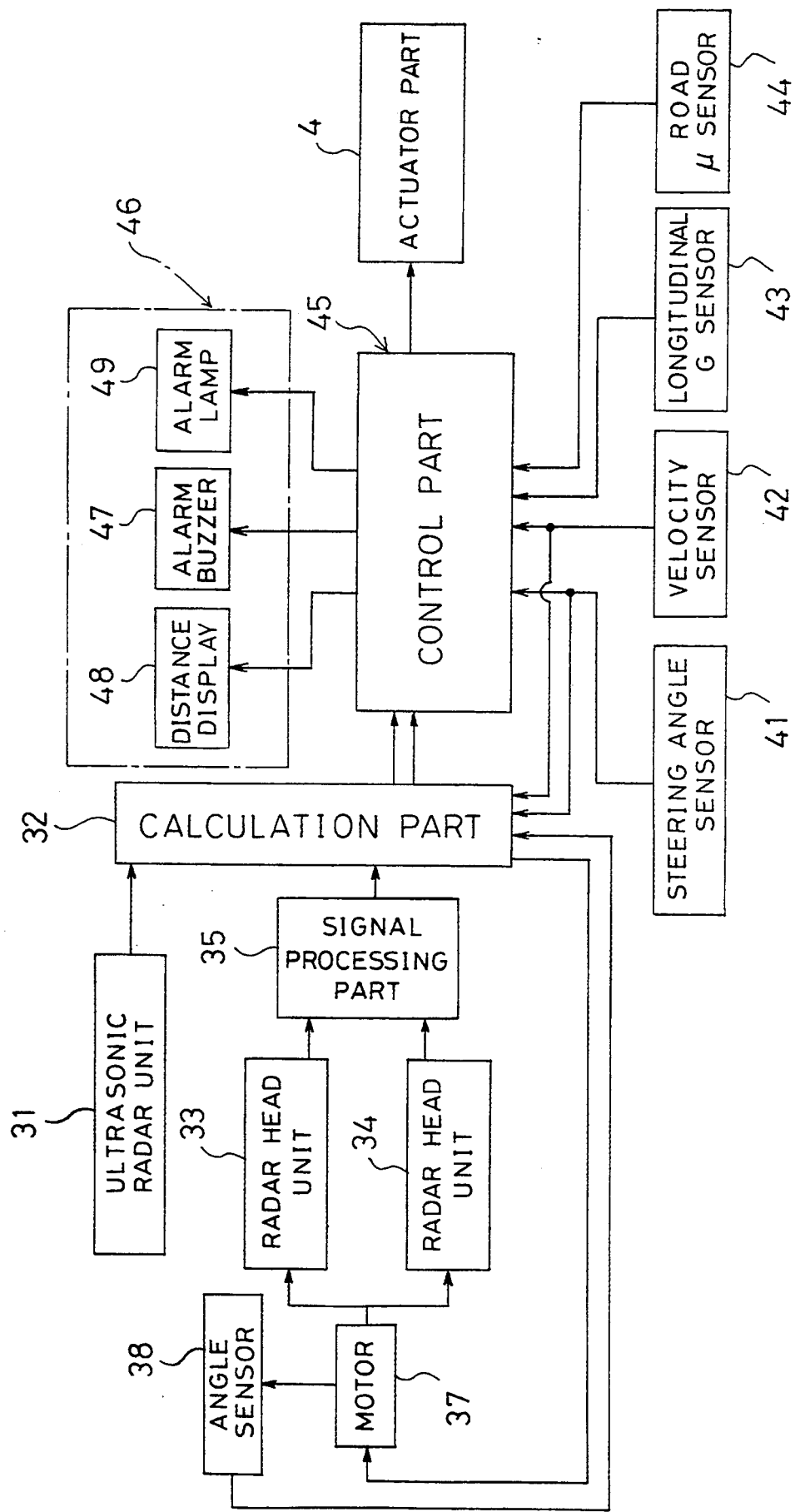
FIG. 2 is a block diagram showing a construction of the same.

FIGS. 1 and 2 show an automatic braking device as a second control device composing one element of a control apparatus for ensuring safety of a vehicle run according to a first embodiment of the present invention.

In FIG. 1, reference numeral 1 indicates a booster for increasing a stepped force of a brake pedal 2 according to a driver, and reference numeral 3 indicates a master cylinder for generating a braking pressure corresponding to the stepped force increased by the booster 1. The braking pressure generated at the master cylinder 3 is first fed to a hydraulic actuator part 4 of the automatic braking device, then to each braking device 6 of four wheels (only one wheel is shown in FIG. 1) through a hydraulic actuator part 5 of an anti-skid braking system (ABS).

The hydraulic actuator part 4 of the automatic braking device has a shutter valve 11 for blocking communication between the master cylinder 3 and the braking device 6 side, a pressure increasing valve 12, and a pressure reducing valve 13. Each of the valves 11–13 is composed of an electromagnetic 2-port 2-position switching valve. Interposed between the pressure increasing valve 12 and the master cylinder 3 are a hydraulic pump 14 which is driven by a motor and an accumulator 15 for storing a pressure oil discharged from the hydraulic pump 14 and maintaining the same at a constant pressure. When the shutter valve 11 is set opened, a brake is applied according to the stepped force of the braking pedal 2 to the braking device 6 of each wheel. When the shutter valve 11, the pressure increasing valve 12 and the pressure reducing valve 13 are respectively set closed, opened and closed, the pressure oil from the accumulator 15 is fed to the braking device 6 of each wheel so as to increase the braking pressure. When the shutter valve 11, the pressure increasing valve 12 and the pressure reducing valve 13 are respectively closed, closed and opened, the pressure oil is returned from the braking device 6 so as to reduce the braking pressure.

The hydraulic actuator part 5 of the ABS has a 3-port 2-position switching valve 21 which is provided for each wheel. When the ABS is operated, the braking pressure applied to each braking device 6 is controlled according to switching of the valve 21 so that each wheel is unlocked. The construction of the hydraulic actuator part 5 (not described in detail) also has a hydraulic pump 22 which is driven by a motor, accumulators 23, 24 and the like, in addition to the switching valve 21. The braking device 6 of each wheel is composed of a disk 26 integrally rotatable with the wheel and a caliper 27 for holding the disk 26, receiving a braking pressure from the master cylinder 3 side.

In FIG. 2, reference numeral 31 indicates a ultrasonic radar unit provided at a front part of a vehicle. As generally known, the ultrasonic radar unit 31 has a construction in which a transmission part transmits ultrasonic waves to a forward vehicle running forward of the vehicle and a receiving part receives waves reflected from the forward vehicle, which is not shown in detail in FIG. 2. A calculation part 32 receives a signal from the radar unit 31 and calculates a distance and a relative velocity between the vehicle and the forward vehicle based on a lag time of received radar waves behind a transmitted time of radar waves. Reference numerals 33 and 34 indicate a pair of radar head units provided at right and left sides of the front part of the vehicle. Each radar head unit 33, 34 has a construction in which a transmission part transmits pulsed laser beams to the forward vehicle and a receiving part receives light reflected from the forward vehicle. The calculation part 32 receives signals from the radar head units 33, 34 through a signal processing part 35 and calculates a distance and a relative velocity between the vehicle and the forward vehicle based on a lag time of received laser light behind a transmitted time of laser light. Further, the calculation part 32 first adopts calculation results of the distance and the relative velocity obtained through a system of the radar head units 33, 34, and complementally uses calculation results of the distance and the relative velocity obtained through a system of the ultrasonic radar unit 31.

Directions in which pulsed laser beams are transmitted from and received by the radar head units 33, 34 are horizontally changeable by a motor 37. An actuation of the motor 37 is controlled by the calculation part 32. Reference numeral 38 indicates an angle sensor for detecting the transmitting and receiving directions of the pulsed laser beams based on a rotational angle of the motor 37. A detection signal generated by the angle sensor 38 is inputted to the calculation part 32. The transmitting and receiving directions of the pulsed laser beams are introduced into the calculation of the distance and the relative velocity by the system of the radar head units 33, 34 at the calculation part 32.

Reference numerals 41, 42, 43 and 44 indicate a steering angle sensor for detecting a steering angle of the vehicle, a vehicle velocity sensor for detecting a vehicle running velocity, a longitudinal G sensor for detecting a longitudinal acceleration (longitudinal G) of the vehicle, and a road $\mu$ sensor for detecting a road friction coefficient $\mu$ respectively. Detection signals generated by the respective sensors 41–44 are inputted to a control part 45. Reference numeral 46 indicates an alarm display unit provided at an interior instrument panel. Provided at the alarm display unit 46 are an alarm buzzer 47, a distance display part 48 and an alarm lamp 49 which receive signals from the control part 45 respectively.

Figure 3:
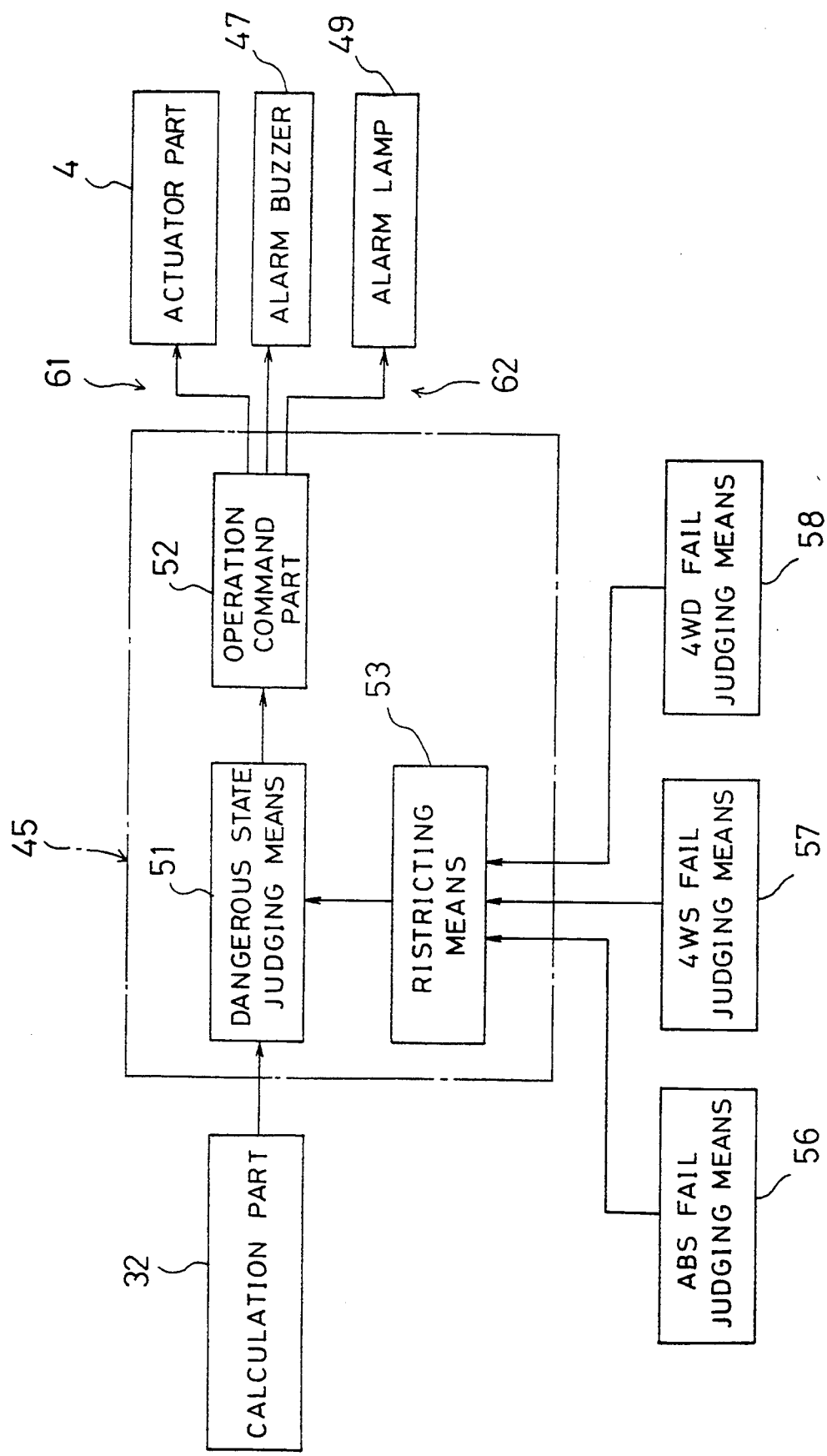
FIG. 3 is a block diagram showing a construction of a control part.

As shown in FIG. 3, the control part 45 has: a dangerous state judging means 51 for judging whether a vehicle running state is now in a dangerous state which has a possibility of contact with a forward vehicle based on the distance and the relative velocity between the vehicle and the forward vehicle which are calculated by the calculation part 32; and an operation command part 52 for outputting respective operation command signals to the hydraulic actuator part 4 of the automatic braking device, the alarm buzzer 47 and the alarm lamp 49 based on a judging signal generated by the judging means 51. The operation command part 52 and the actuator part 4 form braking force applying means (or running velocity reducing means) 61 for applying a braking force to wheels of the vehicle so as to automatically reduce a vehicle running velocity thereof when the judging means 51 judges that the vehicle is in a dangerous state that the distance between the vehicle and the forward vehicle is smaller than a below-mentioned threshold values L2 or L3. The operation command part 52 and the alarm buzzer 47 form alarm means 62 for raising an alarm when the judging means 51 judges that the distance between the vehicle and the forward vehicle is smaller than a below-mentioned threshold value L1.

Figure 4:
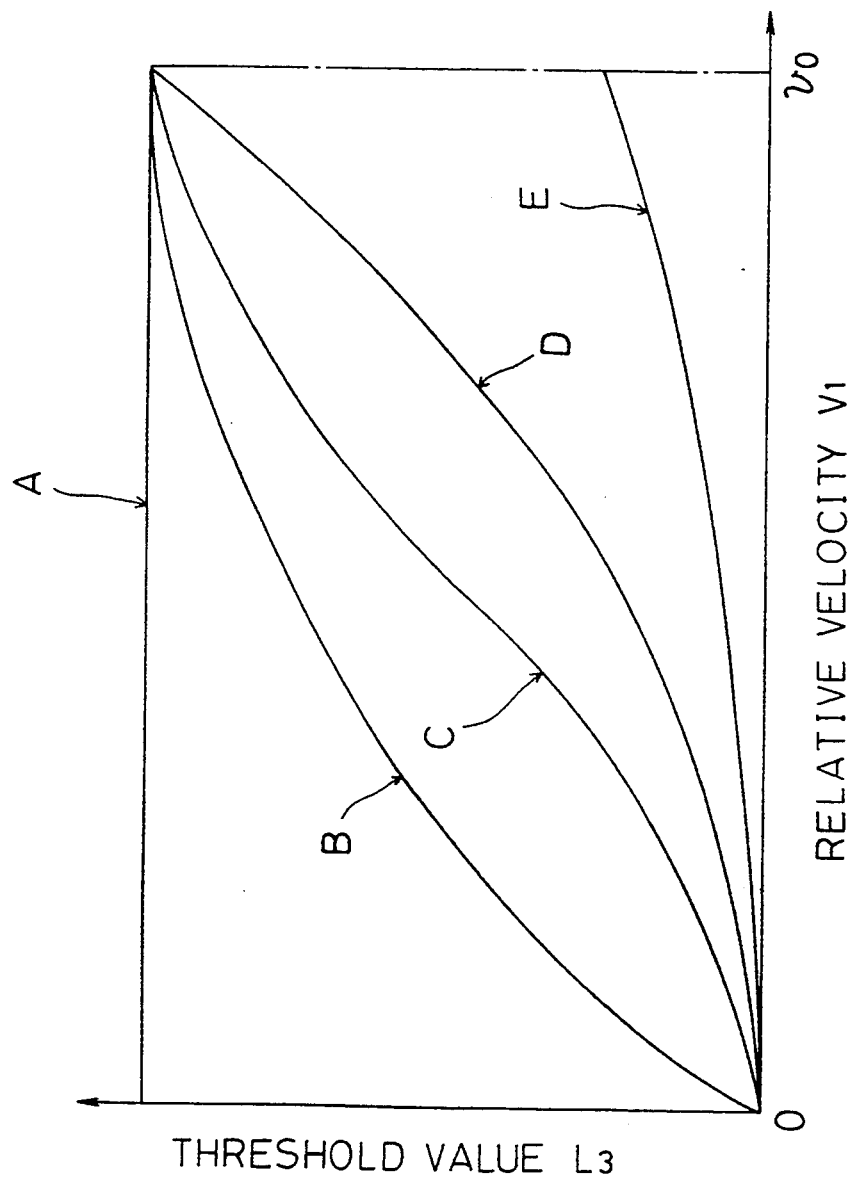
FIG. 4 shows a map for calculating a threshold value for avoiding a contact between a vehicle and a forward vehicle.

The dangerous state judging means 51 first calculates the threshold value L3 (an immediate brake starting distance) of a distance between the vehicle and the forward vehicle at which an immediate brake (a full brake) must be applied to avoid the contact between the vehicle and the forward vehicle, using a previously memorized threshold map as shown in FIG. 4. Next, the dangerous state judging means 51 adds each of set distances to the threshold value L3 and calculates the threshold value L2 (a slow brake starting distance) of a distance therebetween at which a slow brake is applied before an immediate brake and the threshold value L1 (an alarm starting distance) of a distance therebetween at which the alarm buzzer 47 raises an alarm. The above-mentioned immediate brake or full brake means a maximum braking force to the wheels to obtain a maximum deceleration (approximately 0.8 G), and the slow brake means a relatively small braking force to the wheels to obtain a lower deceleration (approximately 0.3 G to 0.4 G) than the maximum deceleration. The threshold value L2 of the distance to apply the slow brake is set several times longer than the threshold value L3 of the distance to apply the immediate brake. The threshold value L1 of the distance to raise the alarm is set longer than the threshold value L2 of the distance to apply the slow brake.

In a threshold value map shown in FIG. 4, a threshold value line A represents a distance between the two vehicles required for avoiding a contact of the vehicle with the forward vehicle when the forward vehicle contacts with a further forward obstruction and stops, and always indicates a same value (v0$^2$/2 $\mu$g) as in case the forward vehicle is stopping (that is, in case the relative velocity V1 of the forward vehicle is equal to a vehicle velocity v0 of the vehicle) regardless of the relative velocity V1. A threshold value line B represents a distance (=V1.(2v0−V1)/2 $\mu$g) between the two vehicles which is required for avoiding a contact of the vehicle with the forward vehicle when the full brake is applied in the forward vehicle. A threshold value line C represents a distance between the two vehicles required for avoiding a contact of the vehicle with the forward vehicle when a slow brake of a speed reducing degree $\mu$/2 g is applied by the forward vehicle. A threshold value line D represents a distance (=V1$^2$/2 $\mu$g) between the two vehicles which is required for avoiding a contact of the vehicle with the forward vehicle when the forward vehicle runs at a constant velocity. A threshold value line E represents a distance between the two vehicles that a shock at a contact of the vehicle with the forward vehicle can be reduced, while the vehicle cannot avoid the contact with the forward vehicle even if an automatic brake is applied in the vehicle. In the map of FIG. 4, when the threshold line is on an axis of abscissa (the threshold value L3 is 0), the automatic brake is necessarily canceled.

The dangerous state judging means 51 selects one of the five threshold value lines A–E according to a driving state of a vehicle, and calculates the threshold value L3 corresponding to a relative velocity V1 between the vehicle and the forward vehicle on the selected threshold value line. For example, the judging means 51 selects the threshold value line B when the vehicle velocity v0 of the vehicle is high, the threshold value line D when the vehicle velocity v0 thereof is medium, or the threshold value line E when the vehicle velocity v0 thereof is low. Then, based on the selected threshold value line, the higher the vehicle velocity v0 is, the larger the dangerous state judging means 51 changes the threshold value L3 for starting the immediate brake.

When a distance between the vehicle and the forward vehicle becomes a distance to raise an alarm, an operation command signal is outputted from the operation command part 52 to the alarm buzzer 47 so that the alarm buzzer 47 raises an alarm. When a distance between the vehicle and the forward vehicle becomes further smaller and is a distance to apply the slow brake or the immediate brake, an operation command signal is outputted from the operation command part 52 to the hydraulic actuator part 4 so that the slow brake or the immediate brake is applied by the hydraulic actuator part 4.

The control part 45 further has restricting means 53 for restricting an operation control, i.e., the automatic brake, of the control part 45 to the actuator part 4 and the alarm buzzer 47 operated based on a judgment of the dangerous state judging means 51. Inputted to the restricting means 53 are a signal generated by ABS fail judging means 56 for judging a fail time when the antiskid braking system improperly works, a signal generated by 4WS fail judging means 57 for judging a fail time when the four wheel steering system improperly works, and a signal generated by 4WD fail judging means 58 for judging a fail time when the four wheel driving device improperly works. The anti-skid braking system, the four wheel steering system and the four wheel driving device (not shown) are well known as devices regarding a running stability of a vehicle in the art. More specifically, the anti-skid braking system controls a braking force so as to prevent the wheels from being locked by the surplus braking force applied thereto at a brake. The four wheel steering system steers rear wheels when front wheels are steered and controls a steering angle of the rear wheels. The four wheel driving device applies driving forces to both the front wheels and the rear wheels and controls the driving forces. In this embodiment, those devices are arranged in the vehicle as first control devices together with the automatic braking device as a second control device. In addition, the fail judging means 56–58 for those devices are provided at a control part or the like of each device for the sake of safety measures of each device.

Explained next is a control of the automatic brake by the control part 45 with reference to a flow chart in FIGS. 5 and 6.

Figure 5:
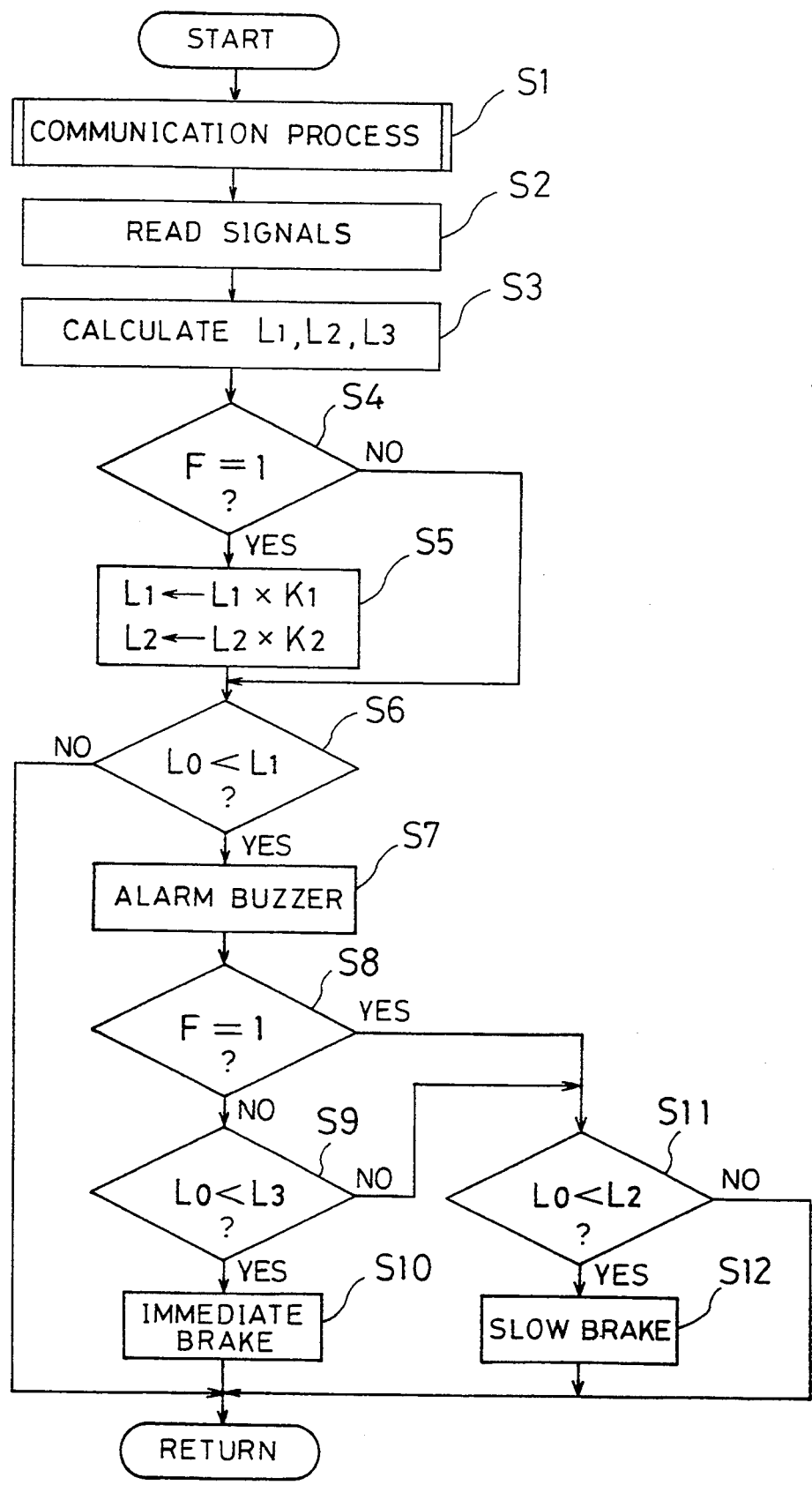
FIG. 5 is a flow chart showing a main flow of an automatic braking control.
Figure 6:
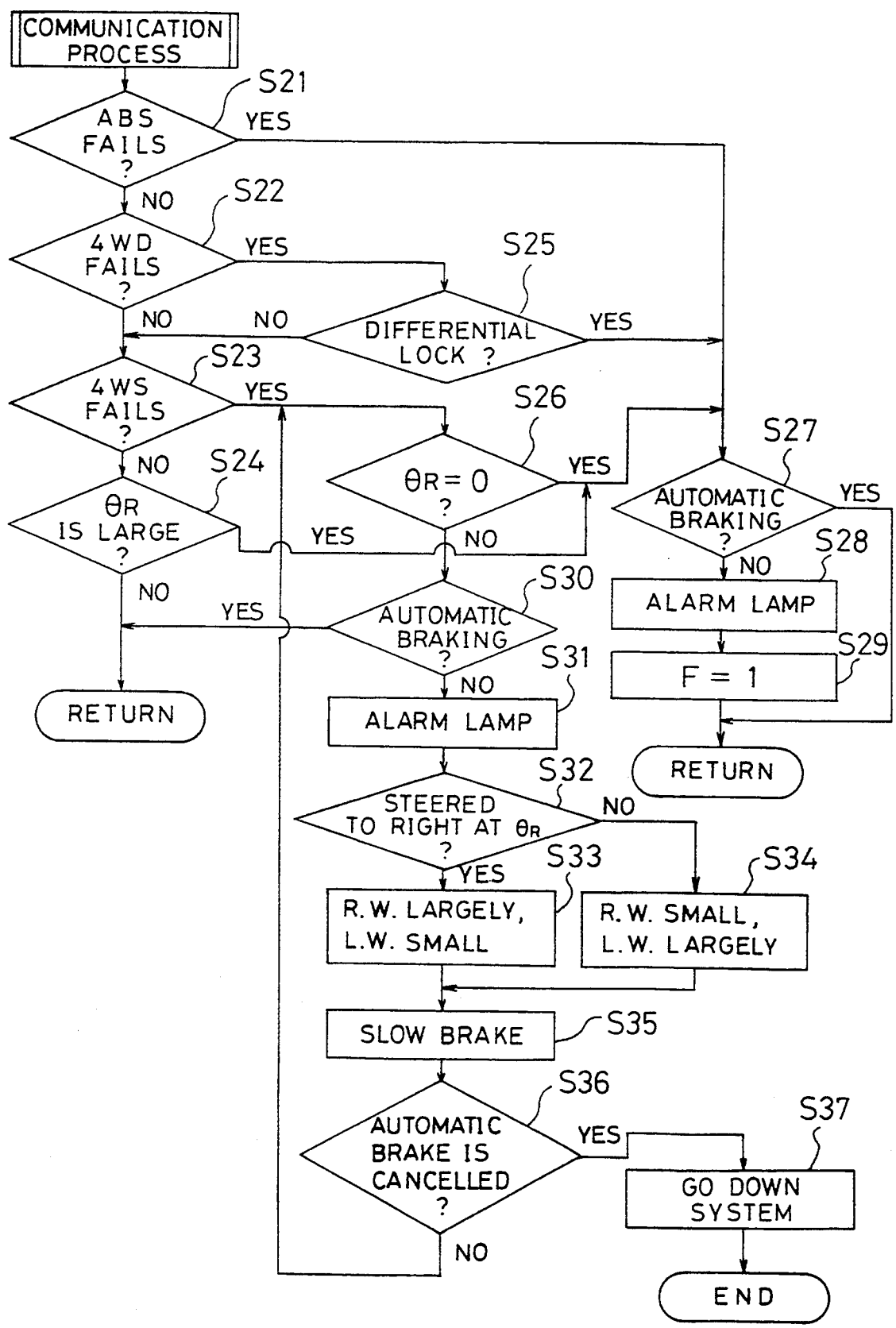
FIG. 6 is a flow chart showing a subroutine of a communication process of the automatic braking control.

In FIG. 5, after a routine starts, a subroutine of a communication process shown in FIG. 6 is first carried out at a step S1. Then, read at a step S2 are respective signals such as a signal with regard to a distance L0 between the vehicle and the forward vehicle. At a step S3, an alarm starting distance L1, a slow brake starting distance L2 and an immediate brake starting distance L3 are calculated using the above-mentioned threshold map of FIG. 4.

At a step S4, judged is whether an immediate brake prohibition flag F is "1". When the judgment is YES, coefficients K1, K2 greater than 1 (K1, K2>1) are respectively added to the previously calculated alarm starting distance L1 and slow brake starting distance L2 at a step S5 so that the alarm starting distance L1 and the immediate brake starting distance L2 are amended, and then the routine moves to a step S6. When the judgment at the step S4 is NO, the routine proceeds to the step S6, skipping over the step S5.

At the step S6, judged is whether the distance L0 between the vehicle and the forward vehicle is smaller than the alarm starting distance L1. When the judgment is NO, the routine immediately returns. When the judgment is YES, the alarm buzzer 47 is operated at a step S7 to raise an alarm. Then, judged at a step S8 is whether the immediate brake prohibition flag F is "1". When the judgment is NO, judged at a step S9 is whether the distance L0 between the vehicle and the forward vehicle is smaller than the immediate brake starting distance L3. When the judgment at the step S9 is YES, the actuator part 4 is operated at a step S10 so that an immediate brake is applied, and then the routine returns.

On the contrary, when the judgment at the step S8 is YES (the immediate brake prohibition flag F is "1"), or when the judgment at the step S9 is NO (the distance L0 between the vehicle and the forward vehicle is larger than the immediate brake starting distance L3), judged at a step S11 is whether the distance L0 is smaller than the slow brake starting distance L2. When the judgment is YES, the actuator part 4 is operated at a step S12 so that the slow brake is applied, and then the routine returns. When the judgment is NO, the routine immediately returns.

In the subroutine of the communication process shown in FIG. 6, first judged at a step S21 is whether the anti-skid braking system (ABS) fails based on the judgment signal from the ABS fail judging means 56. At a step S22, judged is whether the four wheel driving device (4WD) fails based on the judgment signal from the 4WD fail judging means 58. At a step S23, judged is whether the four wheel steering system (4WS) is fails based on the judgment signal from the 4WS fail judging means 57. When all the judgments are NO, judged at a step S24 is whether a rear wheel steering angle $\theta R$ is large based on a signal from a rear wheel steering angle sensor (not shown) of the four wheel steering system. When the judgment is NO, the routine returns.

When the judgment at the step S21 is YES, i.e., at a fail time of the ABS, the routine moves to a step S27. When the judgment at the step S22 is YES, i.e., at a fall time of the 4WD, judged at a step S25 is whether the fail is due to differential lock control by a central differential gear for accepting a difference between the front and rear wheels. When the judgment is YES, the routine moves to a step S27. When the judgment at the step S23 is YES, i.e., at a fail time of the 4WS, judged at a step S26 is whether the rear wheel steering angle $\theta R$ is 0. When the judgment is YES, the routine moves to the step S27. When the judgment at the step S24 is YES, namely, when the rear wheel steering angle $\theta R$ is large, the routine moves to the step S27.

At the step S27, judged is whether the automatic brake is now applied. When the judgment is YES, the routine returns. When the judgment is NO, the alarm lamp 49 is turned on and an alarm is given at a step S28, the immediate brake prohibition flag F is set to "1" at a step S29, and then the routine returns.

When the judgment at the step S26 is NO, namely, when the 4WS fails in a state that the rear wheels are steered in either of a right and left directions, judged at a step S30 is whether the automatic brake is now applied. When the judgment is YES, the routine returns. When the judgment is NO, the alarm lamp 49 is turned on and an alarm is given at a step S31. At a step S32, judged is whether the rear wheels are steered to right at the rear wheel steering angle $\theta R$. When the judgment is YES, i.e., at a right steering state, a braking force to right wheels (a right front wheel and a right rear wheel) is set large and a braking force to left wheels (a left front wheel and a left rear wheel) is set small at a step S33. On the contrary, when the judgment is NO, i.e., at a left steering state of rear wheels, the braking force to the right wheels is set small and the braking force to the left wheels is set large at a step S34. After the braking force is set at the steps S33 or S34, the slow brake based on the set braking force is applied at a step S35. Then, judged at a step S36 is whether the automatic brake is canceled by a driver's intention. When it is canceled thereby, a system of the automatic brake control goes down at a step S37 and the control is over. When the automatic brake is not canceled thereby at the step S36, the routine returns to the step S26.

In the automatic brake control based on the above flow, at a fail of any one of the ABS, the 4WD (especially, a fail thereof due to the differential lock control of the central differential gear) and the 4WS which are devices regarding a running stability of a vehicle, the alarm lamp 49 is turned on, an alarm is given and the immediate brake of the automatic brakes independent of a driver's intention is prohibited. This previously prevents the immediate brake from making the running state of the vehicle worse. On the contrary to the prohibition of the immediate brake, when the alarm starting distance L1 and the slow brake starting distance L2 are larger than that at a non fail time and the vehicle approaches to the forward vehicle, the alarm buzzer 47 raises an alarm at an early time and the slow brake is applied. Accordingly, the contact between the vehicle and the forward vehicle can be avoided.

Further, when the slow brake is applied at a fail of the 4WS in a state that the rear wheels are steered in either of right and left directions, the braking force of wheels on a steered side wheels of right wheels and left wheels are made large and that of wheels on the other side are made small. Thereby, revolving moment of a vehicle due to the steering of rear wheels and revolving moment of a vehicle due to the difference between the braking forces are offset each other so that the vehicle runs straight. This ensures a running stability of the vehicle.

When a 4WS of yaw fete feedback control type is used, the rear wheels are frequently, largely steered due to disturbance such as a side wind, decrease of a road friction coefficient, even a steering wheel is steered a little. When the rear wheels are largely steered ($\theta R$ is large), the immediate brake is prohibited as well as at a fail of the ABS, the 4WD or the 4WS, thereby previously preventing the vehicle from spinning due to the immediate brake.

Figure 7:
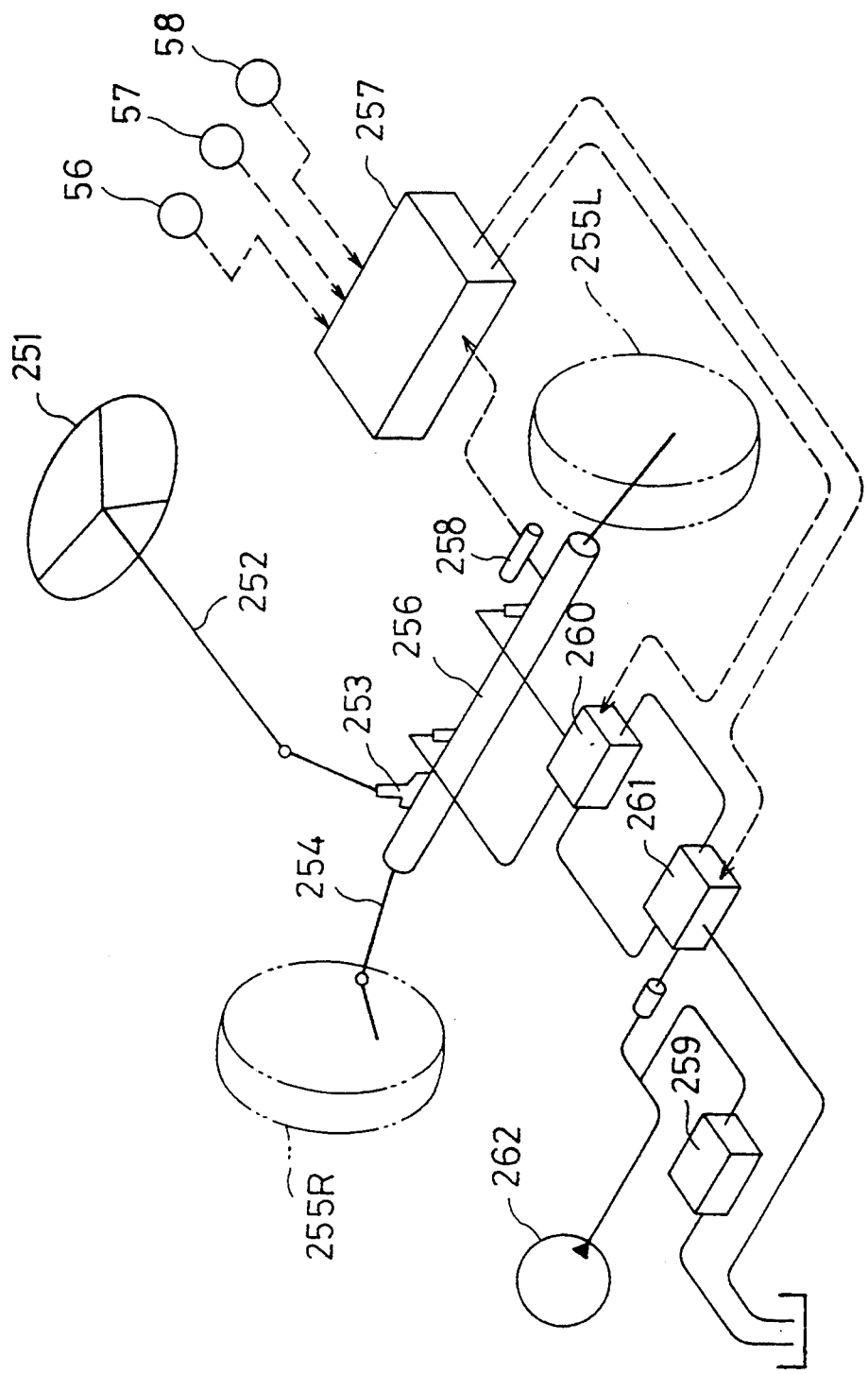
FIG. 7 is a diagram showing a construction of an automatic steering device according to a second embodiment of the present invention.

FIG. 7 shows an automatic steering device according to a second embodiment of the present invention. The automatic steering device is a second control device provided at the vehicle, instead of the automatic braking device of the first embodiment. The automatic steering device detects a distance between the vehicle and the forward vehicle or the like and judges a danger of contact between the two vehicles, as well as the automatic braking device does. The automatic steering device automatically steers the front wheels and changes a running direction of the vehicle, in order to avoid the danger of contact.

In FIG. 7, reference numerals 251 and 252 indicate a steering wheel and a steering shaft respectively. The steering shaft 252 has its upper end connected to the steering wheel 251 and its lower end connected to a left front wheel 255L and a right front wheel 255R through a rack and pinion mechanism 253, a tie rod 254 which extends in a car width direction and the like. The left and right front wheels 255L, 255R are steered by the steering wheel 251. An automatic steering cylinder 256 is provided at the tie rod 254 so that automatic steering can be performed. A control unit 257 receives an output of a position sensor 258 for detecting a position of the tie rod 254, controls a switching valve 260 and an automatic steering valve 261, and feeds pressure oil from a hydraulic pump 262 to the automatic steering cylinder 256 so as to perform an automatic steering by feedback control. In FIG. 7, reference numeral 259 indicates a relief valve.

At the automatic steering, in consideration of a road friction coefficient and motion characteristics of the vehicle, a steering pattern for avoiding a contact is set according to a running condition of the vehicle (a distance between the vehicle and a forward vehicle, a distance between the vehicle and a guide rail and the like). After the automatic steering, if necessary, performed is corrective steering for compensating for erroneous motion caused by deviation of actual vehicle characteristics from vehicle characteristics used for setting the steering pattern, thereby stabilizing the vehicle running state.

In the second embodiment, the ABS, the 4WS and the 4WD as devices regarding a running stability of the vehicle are provided on the vehicle together with the automatic steering device. The signals from the ABS fail judging means 56, the 4WS fail judging means 57 and the 4WD fail judging means 58 which judge fail times of the respective devices are inputted to the control unit 257 of the automatic steering device. Also provided in the control unit 257 is restricting means (not shown) for prohibiting the automatic steering device from working, namely, for wholly prohibiting the automatic steering or restricting only control for abruptly changing a running direction of the vehicle of the automatically steering controls when a signal that any one of the ABS, the 4WS and the 4WD fails is received.

According to the second embodiment, as well as in the case of the first embodiment, when any one of the ABS, the 4WD and the 4WS fails, the whole automatic steering independent of a driver's intention is prohibited or the automatic steering for abruptly changing a vehicle running direction is prohibited. This previously prevents such automatic steering from making the running state of the vehicle worse.

The present invention is not restricted to the first and second embodiments and includes various kinds of modifications. For example, in the first and second embodiments, the restricting means 53 for restricting the workings of the automatic braking device or the automatic steering device at a fall of the ABS, the 4WD or the 4WS is provided in the control part 45 of the automatic braking device or in the control unit 257 of the automatic steering device. However, a position of restricting means 53 is not restricted thereto.

In each of the above embodiments, description is made about the case where the ABS, the 4WD and the 4WS as devices regarding a running stability of a vehicle are provided all together. Besides the case, the present invention is applicable to a case where one or two of the ABS, the 4WD and the 4WS is provided on a vehicle together with the automatic braking device or the automatic steering device, and a case where other devices regarding a running stability of a vehicle, for example, an active suspension system (ACS) which can change suspension characteristics of a vehicle is provided on the vehicle together with the automatic braking device or the automatic steering device.

Further, in the first embodiment, the automatic braking device is so composed to automatically apply a brake in order to avoid a contact between the vehicle and the forward vehicle. An automatic braking device of the present invention is not restricted to the above device. The present invention is applicable to an automatic braking device which is so composed to automatically apply a brake for avoiding a dangerous state of a vehicle, such as for stopping a vehicle at a set stopping line, automatically reducing a vehicle speed to a set legal speed limit or a safety speed when the vehicle speed is beyond the speed limits or the safety speed.

We claim:

1. A control apparatus for ensuring safety of a vehicle run comprising:
   a first control means for controlling a first factor for enhancing a running stability of a vehicle;
   a second control means having a dangerous state judging means for detecting a running state of the vehicle and judging whether the running state is in a dangerous state to output a judgment signal; said second control means automatically controlling a second factor relating to the running state of the vehicle so as to avoid a dangerous state judged by said dangerous state judging means, whereby the running state of the vehicle is automatically prevented from falling into a further dangerous state;
   fail judging means for judging whether said first control means properly functions and for detecting when said first control means improperly functions and for generating an output signal; and
   restricting means for restricting control for avoiding the dangerous state by said second control means when said fail judging means detects that said first control means is improperly functioning.

2. The control apparatus for ensuring safety of a vehicle run according to claim 1,
   wherein said restricting means prevents abruptly changing a running state of the vehicle for avoiding the dangerous state by said second control device.

3. The control apparatus for ensuring safety of a vehicle run according to claim 1,
   wherein said dangerous state judging means of said second control device detects a distance between the vehicle and a forward vehicle and judges that the running state of the vehicle is in a dangerous state when the distance is smaller than a set value, and
   said control means of said second control device is a running velocity reducing means for controlling so as to automatically reduce a running velocity of the vehicle when said dangerous state judging means judges that the distance is smaller than the set value.

4. The control apparatus for ensuring safety of a vehicle run according to claim 3,
   wherein said running velocity reducing means of said second control device is a braking force applying means for applying a braking force of the vehicle.

5. The control apparatus for ensuring safety of a vehicle run according to claim 4,
   wherein said dangerous state judging means of said second control device has a larger threshold value (L2) and a smaller threshold value (L3) corresponding to a distance between the vehicle and the forward vehicle for judging the dangerous state of the vehicle run, and said braking force applying means controls so as to apply a relatively small braking force when the distance between the vehicle and the forward vehicle is smaller than the larger threshold value (L2) and to apply a relatively large braking force when the distance therebetween is smaller than the smaller threshold value (L3).

6. The control apparatus for ensuring safety of a vehicle run according to claim 5, wherein said restricting means prevents applying the relatively large braking force by said braking force applying means when said fail judging means judges that said first control means is improperly functioning.

7. The control apparatus for ensuring safety of a vehicle run according to claim 4, wherein said restricting means amends the set value of the distance therebetween used for judging the dangerous state by said dangerous state judging means for said second control means to a great value when said fail judging means detects that said first control means is improperly functioning.

8. The control apparatus for ensuring safety of a vehicle run according to claim 5, wherein said dangerous state judging means has another threshold value (L1) different from the threshold values (L2, L3), the threshold value (L1) being larger than the threshold values (L2, L3) with regard to the distance between the vehicle and the forward vehicle, and said second control means further has an alarm means for raising an alarm when the distance between the vehicle and the forward vehicle is smaller than the threshold value (L1).

9. The control apparatus for ensuring safety of a vehicle run according to claim 1, wherein the first factor controlled by said first control means is a steering angle of rear wheels of the vehicle.

10. The control apparatus for ensuring safety of a vehicle run according to claim 1, wherein the first factor controlled by said first control means is a braking force applied to wheels of the vehicle.

11. The control apparatus for ensuring safety of a vehicle run according to claim 1, wherein the first factor controlled by said first control means is a driving force applied to wheels of the vehicle.

12. The control apparatus for ensuring safety of a vehicle run according to claim 1, wherein said second control means changes a running direction of the vehicle.

13. The control apparatus for ensuring safety of a vehicle run according to claim 12, wherein said restricting means prevents abruptly changing the running direction of the vehicle by said second control means.

14. A control apparatus for ensuring safety of a vehicle run comprising:

a first control means for controlling a first factor for enhancing a running stability of a vehicle;

a second control means having a dangerous state judging means for detecting a distance between the vehicle and a forward vehicle and judging the running state of the vehicle is in a dangerous state where the distance is smaller than a set value, and braking force applying means for applying a braking force of the vehicle so as to automatically reduce a running velocity of the vehicle when said dangerous state judging means judges that the distance is smaller than the set value, whereby a danger of contact between the vehicle and the forward vehicle is automatically avoided;

fail judging means for judging whether said first control means properly functions and detecting when said first control means improperly functions and for generating an output signal; and restricting means for restricting control for avoiding the dangerous state by said second control means when said fail judging means detects that said first control means improperly functions.

15. The control apparatus for ensuring safety of a vehicle run according to claim 14, wherein said dangerous state judging means of said second control means has a larger threshold value (L2) and a smaller threshold value (L3) corresponding to a distance between the vehicle and the forward vehicle for judging the dangerous state of the vehicle run, and said braking force applying means of said second control means controls so as to apply a relatively small braking force when the distance between the vehicle and the forward vehicle is smaller than the larger threshold value (L2) and to apply a relatively large braking force when the distance is smaller than the smaller threshold value (L3), and said restricting means prevents applying the relatively large braking force by said braking force applying means when said fail judging means judges that said first control means is improperly functioning.

* * * * *